United States Patent
Aarabi

(10) Patent No.: US 10,956,009 B2
(45) Date of Patent: Mar. 23, 2021

(54) METHOD AND SYSTEM FOR INTERACTIVE COSMETIC ENHANCEMENTS INTERFACE

(71) Applicant: L'OREAL, Paris (FR)

(72) Inventor: Parham Aarabi, Richmond Hill (CA)

(73) Assignee: L'OREAL, Paris (FR)

( * ) Notice: Subject to any disclaimer, the term of this patent is extended or adjusted under 35 U.S.C. 154(b) by 79 days.

(21) Appl. No.: 16/141,245

(22) Filed: Sep. 25, 2018

(65) Prior Publication Data

US 2019/0026013 A1 Jan. 24, 2019

Related U.S. Application Data

(63) Continuation of application No. 13/709,750, filed on Dec. 10, 2012, now abandoned.

(60) Provisional application No. 61/630,556, filed on Dec. 15, 2011.

(51) Int. Cl.
*G06Q 30/00* (2012.01)
*G06F 3/0484* (2013.01)

(52) U.S. Cl.
CPC ......... *G06F 3/04845* (2013.01); *G06Q 30/00* (2013.01)

(58) Field of Classification Search
CPC ...................................... G06Q 30/00
See application file for complete search history.

(56) References Cited

U.S. PATENT DOCUMENTS

| 5,924,426 | A | 7/1999 | Galazin |
| 6,293,284 | B1 | 9/2001 | Rigg |
| 6,334,103 | B1 | 12/2001 | Surace et al. |
| 6,338,349 | B1 | 1/2002 | Robinson et al. |
| 6,502,583 | B1 * | 1/2003 | Utsugi ............. A61K 8/02 132/200 |
| 6,584,180 | B2 | 6/2003 | Nemoto |
| 7,079,158 | B2 * | 7/2006 | Lambertsen ......... A45D 44/005 345/592 |
| 7,392,204 | B1 | 6/2008 | Matsumoto et al. |
| 7,487,095 | B2 | 2/2009 | Hill et al. |

(Continued)

OTHER PUBLICATIONS

Salesforce, "Embed real-time support on your website and in your apps with Chat", Salesforce.com, dated Aug 2, 2009. (Year: 2009).*

*Primary Examiner* — Mark A Fadok
(74) *Attorney, Agent, or Firm* — Oblon, McClelland, Maier & Neustadt, L.L.P.

(57) ABSTRACT

Provided is a method and system of providing a cosmetics enhancement interface. The method comprises showing, at the display screen of a computing device having a memory and a processor: a digital photograph including facial features; an interactive dialog portion reflecting a conversational input received and a subsequent response provided thereto from the computing device; and a product display portion; receiving an inquiry, as reflected in the interactive dialog portion, related to a cosmetic product for application onto a selected facial feature; receiving a selection of the cosmetic product based on a matching to the at least one facial feature according to a predefined rule; displaying, at the product display portion, a product representation associated with the selected cosmetic product; receiving an update request; and updating the digital photograph showing a modification to the facial feature on the display screen by simulating application of the selected cosmetic product thereon.

16 Claims, 6 Drawing Sheets

(56) References Cited

U.S. PATENT DOCUMENTS

| | | | |
|---|---|---|---|
| 7,634,103 B2 * | 12/2009 | Rubinstenn | A45D 44/005 382/100 |
| 7,930,182 B2 | 4/2011 | Sinai et al. | |
| 7,962,578 B2 | 6/2011 | Makar et al. | |
| 8,208,694 B2 * | 6/2012 | Jelonek | H04N 21/25891 382/118 |
| 8,660,319 B2 * | 2/2014 | Aarabi | G06K 9/00228 382/100 |
| 9,058,765 B1 * | 6/2015 | Mallick | G06F 3/0482 |
| 2002/0024528 A1 * | 2/2002 | Lambertsen | A45D 44/005 345/646 |
| 2003/0063794 A1 | 4/2003 | Rubinstenn et al. | |
| 2003/0065526 A1 | 4/2003 | Giacchetti et al. | |
| 2003/0065552 A1 | 4/2003 | Rubinstenn et al. | |
| 2003/0065636 A1 * | 4/2003 | Peyrelevade | A45D 44/005 706/62 |
| 2005/0033582 A1 | 2/2005 | Gadd et al. | |
| 2005/0203724 A1 | 9/2005 | Orpaz et al. | |
| 2006/0110417 A1 * | 5/2006 | Hamlin | A45D 33/006 424/401 |
| 2006/0122834 A1 | 6/2006 | Bennett | |
| 2006/0149555 A1 | 7/2006 | Fabbrizio et al. | |
| 2006/0215824 A1 | 9/2006 | Mitby et al. | |
| 2006/0217978 A1 | 9/2006 | Mitby et al. | |
| 2008/0002892 A1 * | 1/2008 | Jelonek | H04N 21/25891 382/224 |
| 2009/0018829 A1 | 1/2009 | Kuperstein | |
| 2009/0228265 A1 | 9/2009 | Chen et al. | |
| 2009/0327182 A1 * | 12/2009 | Chakravarty | H04N 21/4334 706/45 |
| 2010/0030578 A1 * | 2/2010 | Siddique | G06Q 40/12 705/3 |
| 2011/0301441 A1 | 12/2011 | Bandic et al. | |
| 2012/0253825 A1 | 10/2012 | Di Fabbrizio et al. | |
| 2013/0042261 A1 | 2/2013 | Tavormina et al. | |
| 2013/0159895 A1 | 6/2013 | Aarabi | |
| 2013/0300761 A1 | 11/2013 | Ahmed | |

* cited by examiner

METHOD AND SYSTEM FOR INTERACTIVE COSMETIC ENHANCEMENTS INTERFACE

This application claims priority to U.S. Provisional Patent Application No. 61/630,556 filed Dec. 15, 2011, and incorporates by reference the disclosure of said Application No. 61/630,556 in the entirety.

FIELD

The present disclosure relates generally to a system and method for interactive cosmetics enhancements interface, providing for a user to browse, virtually "try on", find and purchase beauty products, among other aspects.

BACKGROUND

Digitally-based detection of facial features based on an accessed digital photograph is finding its way into a variety of internet applications as well as modifications of the digital photograph using various facial visual effects.

Trying on and buying beauty products can be a significant chore when it involves travelling to a store or boutique, then typically trying several beauty products or articles before finding a satisfactory fit in accordance with subjective tastes and prevailing trendiness. Personally travelling to, and taking the time to try several products in the store or boutique can result in a significant inconvenience to shoppers. A streamlined process allowing shoppers/customers to save time, and further gain the benefit of expert opinions regarding recommendations of beauty products to personal preferences and other unique situational context may advantageously provide time-saving benefits to the on-line Internet shopper, enabling them to "try on", in a virtual context via simulation, any beauty article or product using a personal digital photograph, prior to making a purchase.

SUMMARY OF THE INVENTION

Provided is a method, executed in a computing device having a display screen and a processor, of providing a cosmetics enhancement interface comprising showing, at the display screen: a digital photograph including a plurality of facial features; an interactive dialog portion reflecting a conversational input received and a subsequent response provided thereto from the computing device; and a product display portion; receiving an inquiry, as reflected in the interactive dialog portion, related to a cosmetic product for application onto at least one facial feature of the plurality of facial features; receiving a selection of the cosmetic product based on a matching to the at least one facial feature according to a predefined rule; displaying, at the product display portion, a product representation associated with the selected cosmetic product; receiving an update request; and updating the digital photograph showing a modification to the at least one facial feature on the display screen by simulating application of the selected cosmetic product thereon.

In an embodiment the conversational input comprises an audible voice input.

In another embodiment the conversational input comprises a text input.

In one variation of the method, the at least one facial feature consists of one of a nose, at least one lip of a mouth, an eyebrow, an eyelid, a facial cheek, hair and an ear.

In another variation, the cosmetic product consists of one of lipstick, eye shadow, hair color, blush makeup, a cosmetic eye lash, and an article of jewelry.

In a further embodiment, the cosmetics enhancement interface comprises a purchasing tool portion to consummate an e-commerce transaction.

In yet another embodiment, the cosmetics enhancement interface further comprises a product advertisement section showing offers for purchase.

In one variation, the computing device consists of one of a desktop computer, a portable computer, a mobile wireless smartphone, and a kiosk.

The computing device is communicatively coupled to a beauty products database in another variation.

Further to the method provided, the predefined rule for the matching is at least partly based on an event type specified in the conversational input.

In an embodiment, the computing device further includes a memory storing a plurality of earlier conversational inputs of a pre-identified user. The earlier conversational inputs may be used to create a beauty preferences profile of the pre-identified user.

In another embodiment, the product representation includes a plurality of color options for selection of at least one option therefrom.

In, yet another variation, the product representation includes a prioritized list of product options for selection of at least one product option therefrom. The product option selections may be used to create a beauty preferences profile of a pre-identified user.

In a further embodiment, the predefined rule for the matching is at least partly based on the beauty preferences profile of the pre-identified user.

In yet another embodiment, the matching may be performed in the processor of the computing device.

Yet further, the cosmetics enhancement interface further may comprise a video display portion.

In yet another embodiment, the cosmetics enhancement interface may further comprise a plurality of hyperlinks to access websites associated with respective cosmetic products.

BRIEF DESCRIPTION OF THE DRAWINGS

Embodiments will now be described by way of example only, with reference to the following drawings in which.

DETAILED DESCRIPTION

This description pertains to a system for assisting a beauty consumer (i.e. "user") to browse, explore, virtually try-on, and/or purchase beauty products, wherein a user starts by asking a question or request related to her beauty interests or needs. Then, based on the user's initial question or request, the system will search the Internet and its own internal database for relevant information about the product and display the results to the user. The results could be in the form of a before and after photo, a representative image, a video, a set of links, a scrolling list of entries, or any other mechanism for displaying visual search results to the user. The user can then virtually try the beauty products on her digital photo, or ask more questions via an interactive conversation with the system. The user may then purchase the selected beauty products through an e-commerce website, mobile site, or application.

Figure 1:
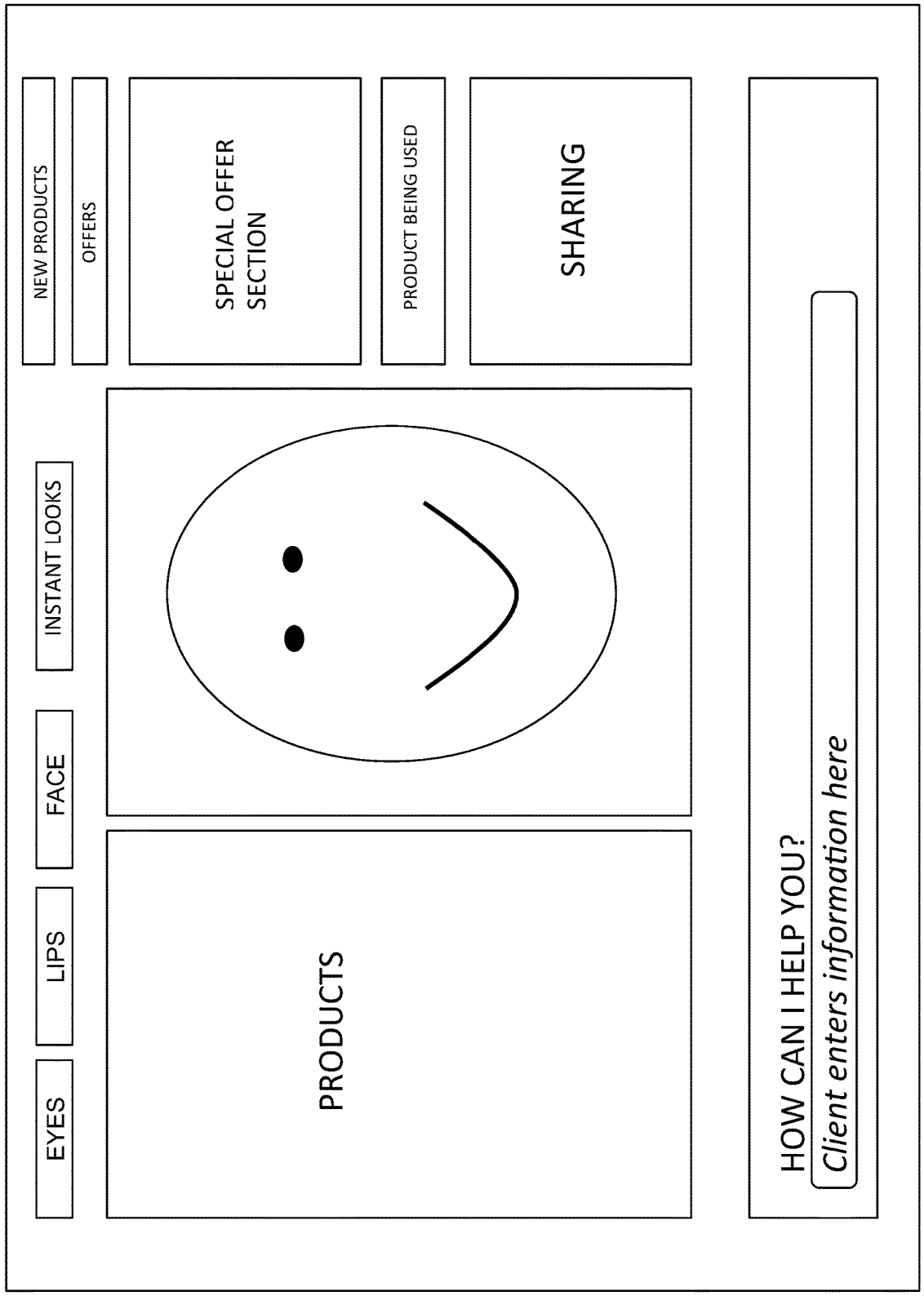
FIG. 1 shows an interactive interface according to an embodiment of the invention.

FIG. 1 shows an interactive interface according to an embodiment of the invention.

A system is designed for assisting a user to browse, explore, virtually try on, and find the best beauty products. FIG. 1 shows an example of the user interface for the system. The large menu at the top of FIG. 1 is the Virtual Makeover tool where the effect of applying different makeup products is simulated. The white box at the bottom of FIG. 1 is the conversation tool provided to the user, which is intended to let the user have a conversation to the system about her beauty needs.

The virtual makeover tool is a system that allows the user to visualize any products, or effects on her own digital photo. This process is done completely automatically, meaning that all the interactions that user will have with the virtual makeover system, is just to provide it with a photo, and select different beauty products, or effects. As soon as the user selects a product or effect, her photo will automatically be updated accordingly.

The conversational tool is an system which allows the user to have conversations to the system and get directions. The conversational tool can work based on either voice or text input from the user. In either case, the input sentences from the user are detected and analyzed. Then the system uses the large data base of the information on the beauty products and their features, and provides the user with responses and guidelines.

A user starts by providing a digital photo of herself to the system, as shown in FIG. 1. This step could be done in different ways depending on the system platform, which includes web, mobile, tablet, or kiosk. This step is done because the system is then going to visualize the beauty products by means of automatically simulating the effect of applying the make up products on the user's face.

The user then proceeds by starting a conversation with the system, related to her beauty interests or needs. For example, the user can start with the request:

I have blue eyes and I am looking for a beautiful eye shadow for my eyes.

Then, the system will respond back to the user with:

Okay. I can help you find an Eyeshadow. I just sorted the palette for you.

This is shown in FIG. 1. What happens is that the virtual makeover tool processes the digital photo of the user, and finds the specific characteristics of the user's eyes. Then, based on those features, and the color of the eyes mentioned by the user, the system automatically detects which eye shadows best match to the user's eyes. Finally the system sorts the palette of eye shadows for the user and provides her with the option to select and try any of them. As soon as the user selects one of the suggested colors for the eyeshadow, an eyeshadow with the same color will immediately be applied to her digital photo on the virtual makeover tool, as shown in FIG. 1. This way, the user can try as many colors as she wants and select the one she is interested in.

Figure 2:
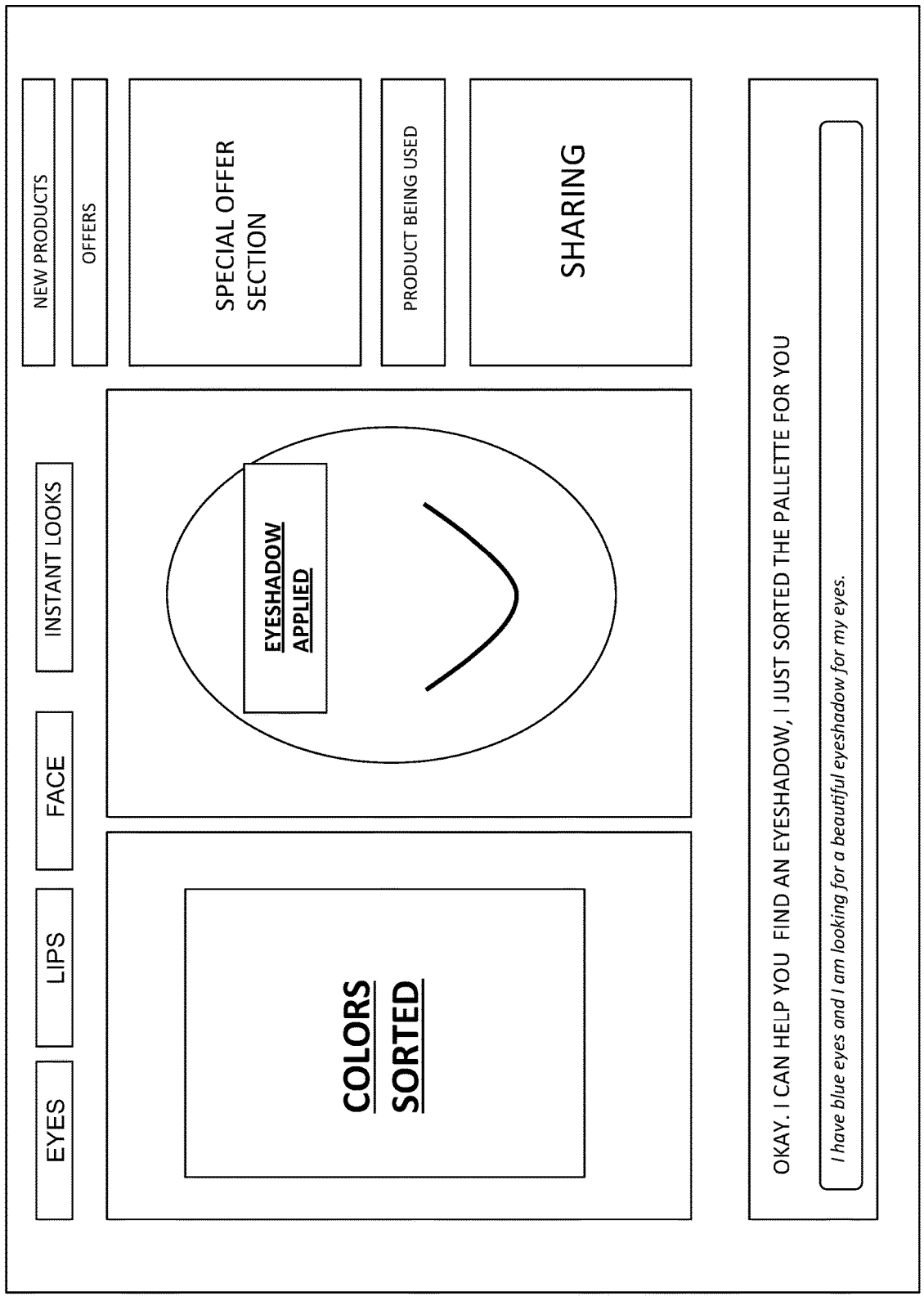
FIG. 2 shows the interactive interface displaying an embodiment of the interactive conversations with a user.

The system is designed in a way that it is not limited to request and questions only. Instead, the user can also describe a situation to the system, and the system will guide them based on their situation. An example of this is shown in FIG. 2. In this example, the user has explained her situation to the system as:

I am going to a party tonight, and I was wondering what color is the best for my lipstick.

The system has then reacted with the response:

For a party, I would recommend darker and more vibrant colors. I have sorted the lipstick products for you.

The lipstick products are then sorted accordingly, as shown in FIG. 2. In this case, the system does not only act as a simple automated chatting tool, but it also has the ability to understand and analyze the exact beauty needs of the user and provide her with a professional recommendation via the interactive conversation tool, FIG. 2 further shows the interactive interface displaying an embodiment of the interactive conversations with a user.

Figure 3:
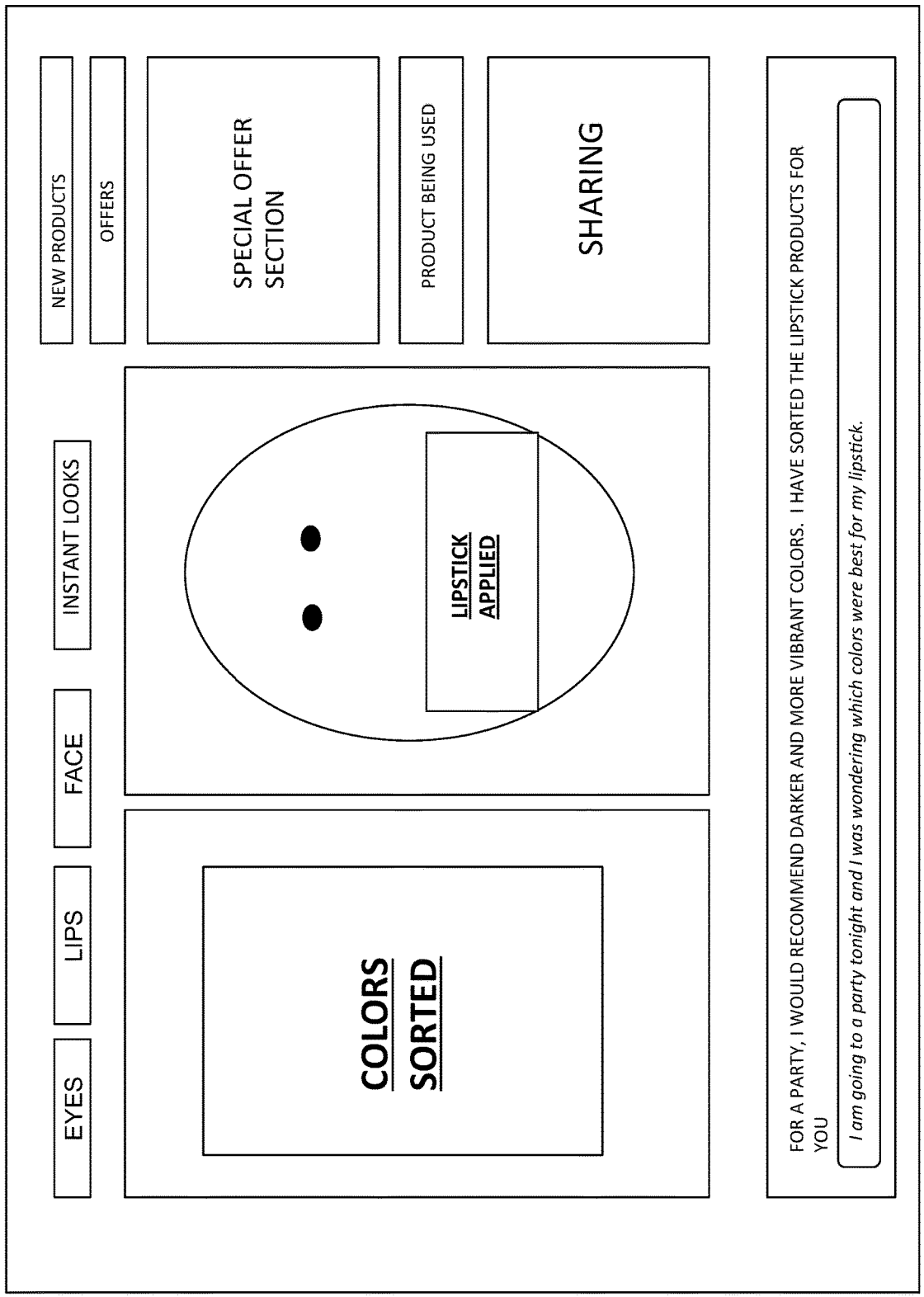
FIG. 3 shows the interactive interface displaying an embodiment of the interactive conversations involving a situational context involving an event specified by user.

FIG. 3 shows the interactive interface displaying an embodiment of the interactive conversations involving a situational context involving an event specified by user.

There are some situations that the system might be able to provide a much better response to the user if it knows some more details about the user's situation. In this case, the system asks the user for more information about her situation. An example of this is shown if FIG. 3. The user has described her situation as:

I am going to a wedding. Could you help me choose a good blush?

The system then asks the following question in order to have more information about the preferences of the user:

Sure, what is the color of your dress for the wedding?

The user's answer could be something like:

It is going to be purple.

Now the system knows the exact preferences of the user and can narrow down the list of the beauty products for this specific user. So the system responds with:

Perfect, I have sorted the blush products that best match to your dress color for you.

Figure 4:
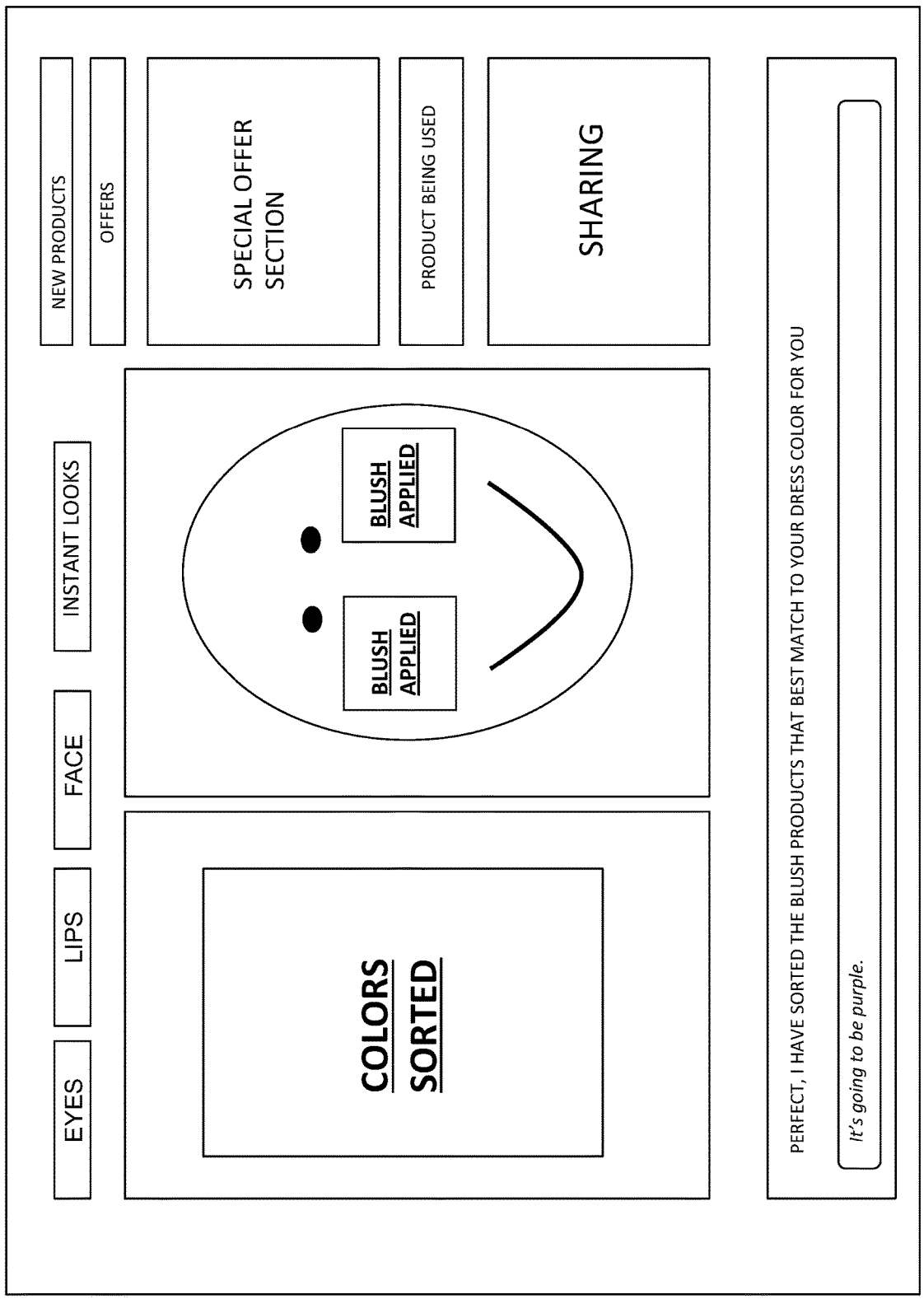
FIG. 4 shows the interactive interface displaying an embodiment of the interactive conversations involving a situational context involving a personal article specified by a user for a style-based matching.

And it sorts the colors of the blush products that best match the color of the user's dress, as in FIG. 4, the interactive interface displaying an embodiment of the interactive conversations involving a situational context involving a personal article specified by a user for a style-based matching.

Figure 5:
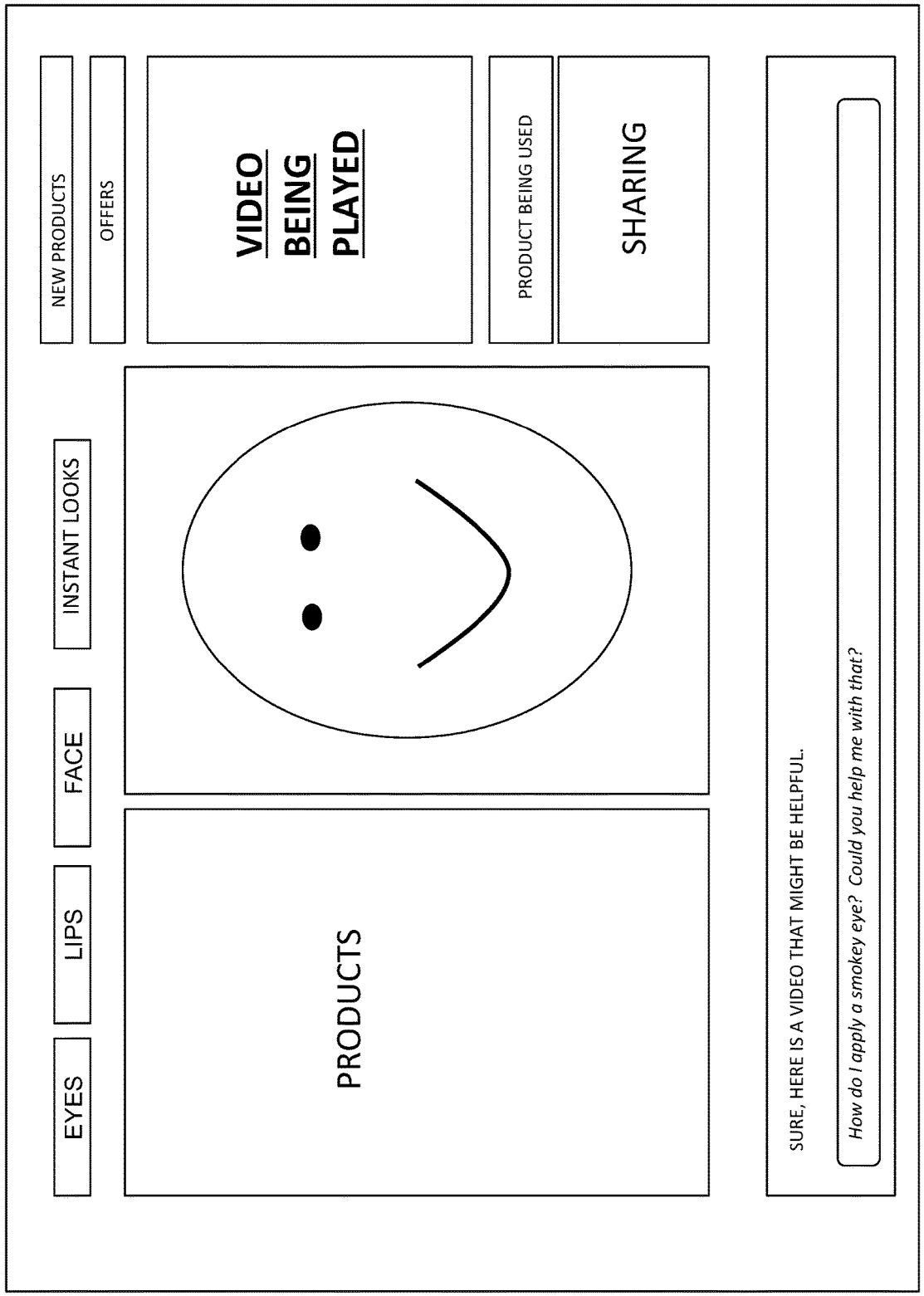
FIG. 5 shows the interactive interface displaying an embodiment of the interactive conversations involving an instructional video related to a product recommendation.

FIG. 5 shows the interactive interface displaying an embodiment of the interactive conversations involving an instructional video related to a product recommendation. There is a component in the system which allows browsing the web based on the user's question and presenting the results to the user. Therefore, all the information about the beauty products on the web is used by the system in addition to the system's database for beauty products. An example of this component is shown in FIG. 5. In FIG. 5, the user has asked the question:

How do I apply a smoky eye effect? Could you help me with that?

The system has then provided the response:

Sure, here is a video that might be helpful.

And it provides video of the specific brand for the user to watch.

Figure 6:
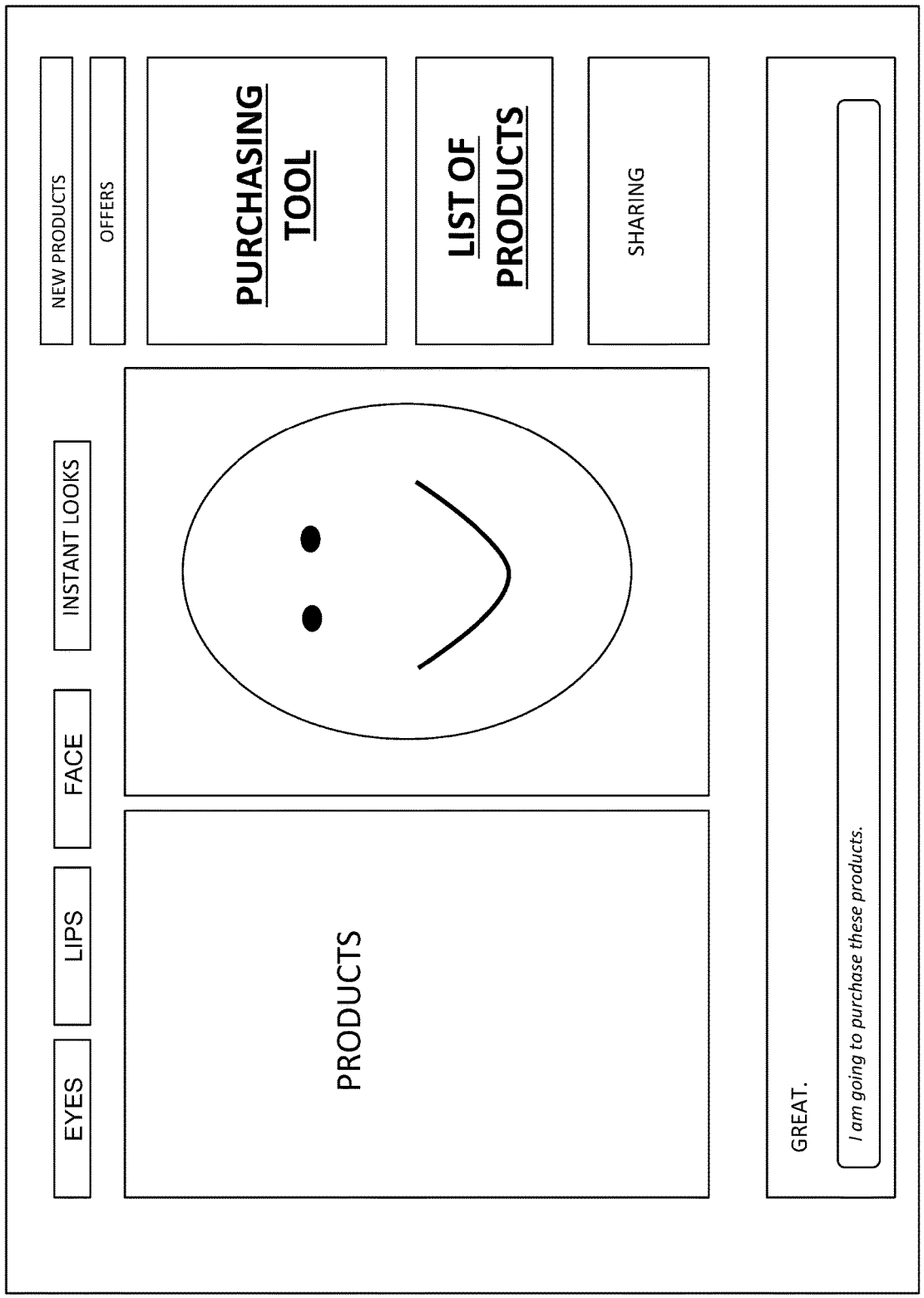
FIG. 6 shows the interactive interface displaying an embodiment of the interactive conversations involving a purchasing tool for entering into and consummating an ecommerce transaction related to a product recommendation.

FIG. 6 shows the interactive interface displaying an embodiment of the interactive conversations involving a purchasing tool for entering into and consummating an e-commerce transaction related to a product recommendation.

The disclosure herein is not limited to the interactive conversations provided in the examples above, but it includes all kind of questions and conversations about the features, pricing, usage, and all other details of the beauty products.

There is a component in the interactive conversational system, which keeps track of the whole conversation, as well as the products already selected by the user. So the details of the conversation and the make up products the user has tried and selected are all stored. This information is considered when providing responses to the user for the next steps. Therefore, when the system is about to provide the response to the user's question, it not only uses its own large database of beauty products and their features, but it also uses the history of the conversation it has had to the current user. So for example, if the user has selected a green blush for her face, and now she is looking for a lipstick, then the system can take this into account for recommending a lipstick color to the user.

There is a component of the system that collects the overall results of the conversations with the users. The overall results include the details of the conversations, the details of the products tried and selected by the users. The system then utilizes these overall results, in order to update the large database of beauty products and their features that it uses to communicate to the users.

A component is also provided in the updating part of the system that keeps track of all the beauty products in the market. This component then updates the database of beauty products in the system according to the products currently available in the market. This way, the system is always synchronized with the most up to date beauty products.

The system collects all the beauty products selected by the user during a conversation and displays them on the interface as shown in FIG. 6. The conversation will continue until the user is satisfied with the collection of products that are visualized on her photo. At this, point, there is a component in the system that makes it possible for the user to purchase them through an e-commerce web or mobile site.

The disclosure herein is not limited to the makeup products on the face only. Rather, it pertains to other kinds of beauty products, such as but not limited to hair color and dressing products. For all other kinds of beauty products, the user can have conversations to the system about the specific product, and get directions for application or use.

Although the invention has been described with reference to specific exemplary embodiments in the disclosure herein, varying modifications thereof will be apparent to those skilled in the art without departing from the scope of the invention as defined by the appended claims.

The invention claimed is:

1. A computing platform having a processor and a memory, the memory storing instructions which when executed by the processor provide virtual tools to simulate effects on a digital photo, the virtual tools operating to configure the computing platform to:
   generate a virtual display of a digital photo including a face;
   automatically extract facial features from the digital photo;
   determine a matched color and specific cosmetic products to virtually try on the virtual display based on an audio input or textual input related to the cosmetic products; and
   interactively modify the virtual display including the face with one or more of the specific cosmetic products,
   wherein the audio input or textual input comprises a conversational input from a user that describes an event to be attended by the user as a first portion of the conversational input,
   wherein the virtual tools operate to configure the computing platform to, in response to receiving the first portion of the conversational input:
   analyze the first portion of the conversational input;
   automatically generate and present a follow-up question to solicit a description of a personal article to be worn by the user at the described event as an additional portion of the conversational input; and
   determine the matched color and specific cosmetic products to virtually try on the virtual display based on the event and personal article described by the user in the conversational input.

2. The computing platform of claim 1 wherein to interactively modify comprises receiving selection input to select among the specific cosmetic products to define the one or more of the specific cosmetic products and update the virtual display.

3. The computing platform of claim 2 wherein the virtual tools comprise an interactive graphical user interface for displaying output and receiving input comprising:
   a first portion in which to virtually display the face modified with the one or more specific cosmetic products;
   a conversation portion to interactively receive the conversational input; and
   a cosmetic products portion to display the specific cosmetic products selected in response to the conversational input and to receive one or more selection inputs to further select among the specific cosmetic products to define the one or more specific cosmetic products to virtually try on.

4. The computing platform of claim 3 wherein the virtual tools operate to configure the computing platform to receive a plurality of selection inputs and responsive to each, interactively modify the virtual display with a respective one of the specific cosmetic products.

5. The computing platform of claim 3 wherein the virtual tools operate to configure the computing platform to:
   receive additional conversational input and determining a second matched colour and second cosmetic products to virtually try on the virtual display and
   interactively modify the virtual display including the face with one or more of the second specific cosmetic products.

6. The computing platform of claim 1 wherein the facial features comprise at least some of a nose, a lip, an eyebrow, an eyelid, a facial cheek and an ear.

7. The computing platform of claim 1 wherein the facial features comprise, a skin color, a skin texture, an eye color and a hair color.

8. The computing platform of claim 1 wherein the cosmetic products comprise a lipstick, an eye shadow, a hair color, and a blush makeup.

9. A method executed in a computing platform having a processor and a memory, the memory storing virtual tools to simulate effects on a digital photo, the method comprising:

generating a virtual display of a digital photo including a face;

automatically extracting facial features from the digital photo;

determining a matched color and specific cosmetic products to virtually try on the virtual display based on an audio input or textual input related to the cosmetic products; and interactively modifying the virtual display including the face with one or more of the specific cosmetic products, wherein the audio input or textual input comprises a conversational input from a user that describes an event to be attended by the user as a first portion of the conversational input, wherein the method further includes, in response to receiving the first portion of the conversational input:

analyzing the first portion of the conversational input;

automatically generating and present a follow-up question to solicit a description of a personal article to be worn by the user at the described event as an additional portion of the conversational input; and determining the matched color and specific cosmetic products to virtually try on the virtual display based on the event and personal article described by the user in the conversational input.

10. The method of claim 9 wherein interactively modifying comprises receiving selection input to select among the specific cosmetic products to define the one or more of the specific cosmetic products and update the virtual display.

11. The method of claim 10 comprising providing an interactive graphical user interface for displaying output and receiving input comprising:

a first portion in which to virtually display the face modified with the one or more specific cosmetic products;

a conversation portion to interactively receive the conversational input; and a cosmetic products portion to display the specific cosmetic products selected in response to the conversational input and to receive selection input to further select among the specific cosmetic products to define the one or more specific cosmetic products to virtually try on.

12. The method of claim 11 comprising receiving a plurality of selection inputs and responsive to each, interactively modifying the virtual display with a respective one of the specific cosmetic products.

13. The method of claim 11 comprising receiving additional conversational input and determining a second matched colour and second cosmetic products to virtually try on the virtual display and interactively modifying the virtual display including the face with one or more of the second specific cosmetic products.

14. The method of claim 9 wherein the facial features comprise at least some of a nose, a lip, an eyebrow, an eyelid, a facial cheek and an ear.

15. The method of claim 9 wherein the facial features comprise, a skin color, a skin texture, an eye color and a hair color.

16. The method of claim 9 wherein the cosmetic products comprise a lipstick, an eye shadow, a hair color, and a blush makeup.

* * * * *